United States Patent [19]

Johnson

[11] Patent Number: 4,606,435

[45] Date of Patent: Aug. 19, 1986

[54] BRAKE LINING WEAR SENSOR AND INDICATOR CIRCUIT

[75] Inventor: Gregory J. Johnson, Grand Blanc, Mich.

[73] Assignee: General Motors Corporation, Detroit, Mich.

[21] Appl. No.: 649,134

[22] Filed: Sep. 10, 1984

[51] Int. Cl.[4] .................. F16D 66/00; B60Q 1/00
[52] U.S. Cl. .................. 188/1.11; 340/52 A; 340/66
[58] Field of Search ............ 188/1.11; 192/30 W; 340/52 A, 52 B, 66, 52 R, 661; 116/208; 501/90, 92; 252/516

[56] References Cited

U.S. PATENT DOCUMENTS

| | | | |
|---|---|---|---|
| 2,217,176 | 10/1940 | Madison | 188/1.11 |
| 3,052,814 | 9/1962 | Edwards et al. | 252/516 |
| 3,271,737 | 9/1966 | Bezemek | 340/52 A |
| 3,641,546 | 2/1972 | Blackburn | 340/661 |
| 3,673,588 | 6/1972 | Riff | 340/52 R |
| 3,813,665 | 5/1974 | Parfomak et al. | 340/661 |
| 4,184,145 | 1/1980 | Fima | 116/208 X |
| 4,204,190 | 5/1980 | Wiley et al. | 188/1.11 X |
| 4,241,603 | 12/1980 | Man et al. | 188/1.11 X |
| 4,298,857 | 11/1981 | Robins et al. | 340/52 A |
| 4,387,789 | 6/1983 | Borugian | 188/1.11 |

FOREIGN PATENT DOCUMENTS 2092665  8/1982  United Kingdom ............ 340/52 A

*Primary Examiner*—Bruce H. Stoner, Jr.
*Assistant Examiner*—Robert J. Oberleitner
*Attorney, Agent, or Firm*—Warren D. Hill

[57] ABSTRACT

A brake lining wear sensor includes a metal contact secured to a grounded brake lining support plate through a semiconductor ceramic bushing containing silicon carbide and silicon nitride which establishes an electrical resistance between the contact and the support plate so that the contact has a resistance to ground when the brake lining is not worn, but when the brake lining is worn and the contact touches a grounded brake rotor or drum, a short to ground occurs. The sensor is coupled by a lead wire to an indicator circuit which tests for the resistance value in the circuit path to ground to determine whether the contact is connected to the indicator circuit and whether it is electrically grounded to the rotor. An indicator lamp comprises a tri-color LED to emit different colors signifying a normal condition, an open circuit or a worn brake lining condition.

6 Claims, 3 Drawing Figures

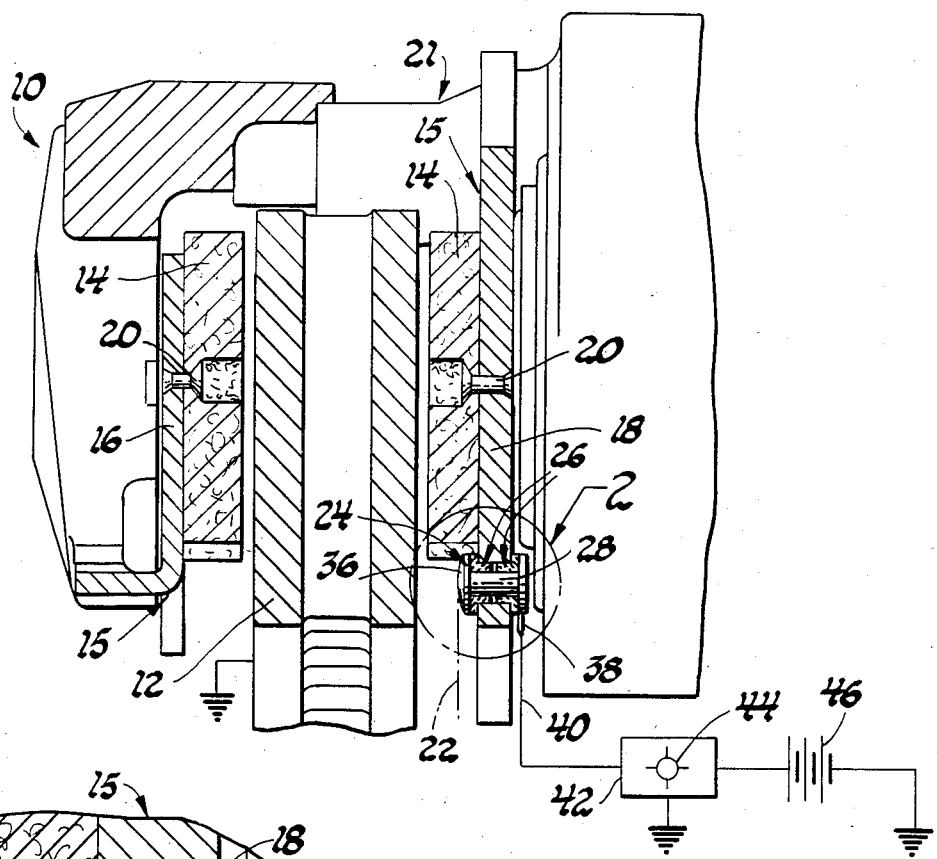
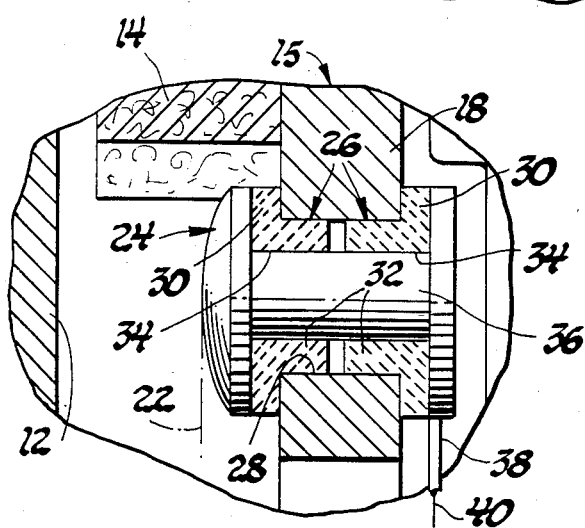
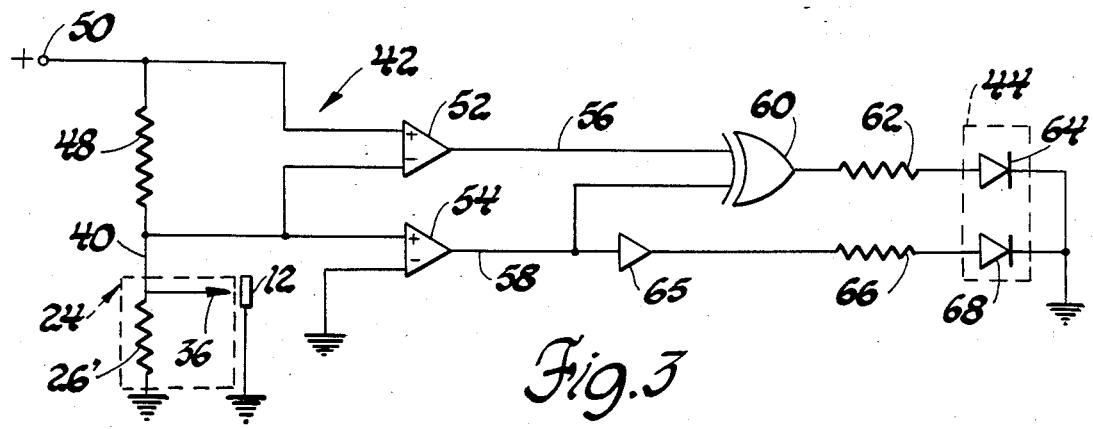
Fig. 1
Fig. 2
Fig. 3

BRAKE LINING WEAR SENSOR AND INDICATOR CIRCUIT

This invention relates to a brake lining wear sensor and associated indicator circuit for providing an indication of brake lining conditions and circuit integrity.

In the case of either disc brakes or drum brakes a brake lining on a nonrotating element engages a brake drum or rotor and with extended usage the brake lining will eventually wear away. To advise the operator of a worn condition requiring lining replacement, it has become the practice on some vehicles to place a contact on the brake lining support which extends toward the rotating element to a position representing the desired lining wear limit. The contact, when it engages the rotating element, makes a noise audible to the operator, or completes an electrical circuit to light an indicator lamp in view of an operator. The United States patent to Madison U.S. Pat. No. 2,217,176 exemplifies the latter type of arrangement where a contact fastened to a brake shoe completes an electrical circuit through the brake drum when the brake lining wears to the limit value. The contact is insulated from the brake shoe so that an electrical circuit can be completed only when the lining wear limit has been reached. The contact is connected to an indicator through a wire lead, and in the event that the lead becomes disconnected from the contact or becomes broken, no indication will occur when the brake lining wear reaches its limit.

It is therefore a general object of the invention to provide an electrical brake lining wear sensor for providing information regarding brake wear as well as circuit integrity. It is a further object to provide a brake wear indicator circuit including such a sensor which yields an indication of brake lining wear as well as an open circuit between the indicator circuit and the sensor.

The invention is carried out by providing a contact mounted on a brake lining support and coupled to the support through a semiconductor material such that normally a high resistance within a predetermined range is present between the contact and ground but when the brake wear limit is reached, a short to ground occurs. The invention is further carried out by an indicator circuit which distinguishes between the shorted condition, the high resistance condition and an open circuit condition which occurs in the case of a broken or disconnected lead and provides a signal indicating which of the three conditions exists.

The above and other advantages of the invention will become more apparent from the following description taken in conjunction with the accompanying drawings wherein like reference numerals refer to like parts and wherein:

FIG. 1 is a partial sectional view of a disc brake arrangement including a sensor according to the invention;

FIG. 2 is an enlarged view of the encircled portion of FIG. 1 further illustrating the sensor according to the invention; and FIG. 3 is a schematic circuit diagram of an indicator circuit according to the invention for use in conjunction with the sensor of FIGS. 1 and 2.

The invention is described herein in the context of automotive disc brakes. However, it is not limited to that application and certainly applies equally well to drum brakes as well as to nonautomotive applications wherever brake linings are used.

Referring to FIG. 1, a disc brake assembly 10 comprises a rotor 12 positioned between a pair of brake pads 15 each having a brake lining 14 mounted by rivets 20 on backing plates or supports 16 and 18 respectively. During brake operation, the pads 15 are squeezed against the opposite faces of the rotor 12 by a hydraulically operated caliper assembly 21. The ensuing frictional engagement of the rotating rotor 12 and the nonrotating pads 15 causes gradual wear of the brake lining. Should the lining wear to the extent that the rivets 20 contact the rotor 12, scoring of the rotor would result. The preferred practice is to replace the brake linings well before rivet 20 contact with the rotor 12 occurs. Thus it is desirable that brake wear indication be given when the wear limit is reached. The wear limit is represented by the dotted line 22. That line is spaced from the backing plate by, say, 4.5 mm. The backing plate 18 extends laterally beyond the lining 14 and contains an aperture 28 to which a sensor 24 is secured. The sensor 24 includes a portion extending from the backing plate 18 toward the rotor 12 to the lining wear limit 22.

As best shown in FIG. 2, the sensor 24 comprises a pair of semiconductive ceramic bushings 26 which fit on opposite sides of the backing plate 18 and extend partially through the aperture 28 in the plate 18. Each bushing 26 includes a radial flange 30 which engages a surface of the backing plate 18. A depending annular boss portion 32 extends partially into the aperture 28 and defines an inner through-hole 34. A soft metal rivet 36, preferably brass, serves as a sensor contact 36 and extends through the holes 34 of the bushings 26 to secure the bushings to the plate 18. The head of the rivet 36 then is the portion which extends to the wear limit line 22 and which makes contact with the rotor 12 when the wear limit is reached. A connector tab 38 extending from the end of the rivet opposite the contacting head, connects to a lead wire 40 which, as shown in FIG. 1, connects in turn to an indicator circuit 42 which has an indicator light 44. Circuit 42 is connected to ground and is also connected to a battery 46 or to a regulated power supply which is also connected to ground. In the automotive vehicle application, the ground comprises the vehicle chassis and thus the rotor 12 and the backing plate 18 are also connected to ground.

It is important that the bushings 26 be semiconductive rather than good insulators in order to provide a resistive electrical connection of the contact 36 to the grounded backing plate 18. A wide range of resistance between the contact and backing plate is acceptable for the circuit to be described. An operating range of two ohms to 85,000 ohms is permissible. Satisfactory results have been obtained with a nominal resistance of 2,000 ohms which decreased at high temperatures to about 1,000 ohms. The resistance must always be maintained within the allowable range even though it is exposed to many harsh environmental conditions such as high temperatures, salt water, and dirt. This result may be obtained from many different semiconductor materials. It is preferred to use a ceramic material having a bulk resistivity of 10,000 to 100,000 ohms per cm. Of course, the particular resistance obtained in the end product will depend on bulk resistivity as well as the specific configuration and dimensions of the bushings. A suitable high-strength ceramic comprises a mixture of insulating and conductive materials, e.g., silicon nitride and silicon carbide, respectively, combined with common sintering additives. A material of this type is disclosed in U.S. Pat. No. 3,052,814 Edwards et al. Another material of this type which I have successfully tested for this application is disclosed in copending U.S. patent application Ser. No. 649,060.

Another bushing configuration (not shown) uses a pair of simple semiconductive washers. The support plate 18 must be counterbored on each side of the aperture 28 to receive a portion of the thickness of each washer in order to positively locate the washers relative to the aperture 28.

FIG. 3 shows in schematic form the grounded rotor 12 and the sensor 24 comprising the contact 36 and a resistor 26' which represents the resistance of the bushings 26 between the contact 36 and ground. The lead wire 40 couples the sensor 24 to the indicator circuit 42. The indicator circuit 42 comprises a 10,000-ohm resistor 48 connected between a power supply terminal 50 and the lead wire 40. A first window comparator 52 has its positive input connected to the terminal 50 and one side of the resistor 48 and its negative input connected to the other side of the resistor 48. A second window comparator 54 has its positive input connected to the negative input of the comparator 52 and its negative input connected to ground. The comparators 52 and 54 are coupled by lamp-driving circuitry to the indicator light 44. The output lines 56 and 58 of the comparators 52 and 54 respectively are connected to the inputs of an exclusive OR gate 60. The output of gate 60 is connected through a resistor 62 to the anode of an LED 64 which emits light, preferably red in color when it is energized. The output line 58 of the comparator 54 is fed through a noninverting buffer 65 and a resistor 66 to the anode of a second LED 68 which when energized emits a light, preferably green in color. The cathodes of both LEDs are connected to ground. The LEDs 64 and 68 are packaged together to form the indicator light 44 such that when either one of the LED is energized, a red or green indicator light will be visible, but when both LEDs are energized, the blending of the two colors appears to be yellow. The resulting effect is a tri-color LED. Such LED combinations are commercially available, for example, as part number LD 100-5, manufactured by Litronix, Inc., of Cupertino, Calif.

In operation, the window comparators 52 and 54 will produce an output signal whenever there is a minimum voltage drop across their respective inputs. As long as the lead wire 40 connects the resistor 48 to the sensor 24, current will flow through the resistor 48 and the resistor 26' to ground, or through the contact 36 and rotor 12 to ground. Thus the comparator 52 will always be turned "on" when the lead wire 40 is effectively connected to the sensor 24. If the lead wire 40 is broken or is disconnected from the sensor 24, there will be no current through the resistor 48 and the comparator 52 will be turned "off". At the same time the power supply voltage will be applied to the positive input of comparator 54 to turn it on. Assuming the lead wire 40 is intact and the contact 36 does not engage the rotor 12, the current flow through the resistor 26' generates sufficient voltage to turn the comparator 54 "on" to produce an output signal on line 58. On the other hand, if the contact 36 engages the rotor 12, as occurs when the brake lining has worn to its limit, there will be essentially no voltage across the comparator 54 input and the comparator 54 will be "off".

The lamp driver logic is dictated by the exclusive OR gate 60 coupling either comparator output to the red LED 64 and by the buffer 65 coupling the output of comparator 54 to the green LED 68. During normal operating conditions, the brake lining has not worn to its limit condition and the lead wire 40 is intact. Both window comparators 52 and 54 are turned "on" so that the exclusive OR gate 60 has no output voltage and only the green LED 68 is illuminated. Thus the green light signifies the normal condition and in particular that the integrity of the sensor connection is maintained. When the brake lining is worn to the wear limit, and the contact 36 engages the rotor 12, the comparator 54 is turned "off" while the comparator 52 is "on" so that only the red LED 64 is illuminated. Thus a red light is a warning of brake lining wear. If the lead wire 40 is broken or disconnected, the comparator 52 is "off" and the comparator 54 is "on" so that both LEDs 64 and 68 are energized to emit a light of yellow appearance. Thus a yellow light is a warning of an open circuit condition.

It will thus be seen that the invention described herein comprising a brake lining wear sensor contact permanently coupled to ground through a semiconductive bushing allows monitoring not only the brake lining condition but also the connection of the sensor to an indicator circuit. It will also be seen that such a sensor coupled with an indicator circuit provides a simple way to indicate by a tell-tale signal whether the sensor is in circuit with the indicator and if so whether the brake lining needs to be replaced.

The embodiments of the invention in which an exclusive property or privilege is claimed are defined as follows:

1. A brake lining wear sensor for brakes having an electrically grounded lining support and an electrically grounded rotor, comprising
an electrically conductive contact on the lining support at a position corresponding to the desired lining wear limit for making contact with the rotor when the wear limit is attained; and
means for mounting the contact on the grounded lining support to provide an electrically resistive path having a resistance in the range of about 2 to 85,000 ohms between the contact and grounded lining support, whereby there is normally a substantial resistance between the contact and ground and when the lining is worn to the limit there is an electrical short from the contact to ground.

2. A brake lining wear sensor for brake having an electrically grounded lining support and an electrically grounded rotor, comprising
an electrically conductive contact on the lining support at a position corresponding to the desired lining wear limit for making contact with the rotor when the wear limit is attained, and
means for mounting the contact on the grounded lining support including semiconductive ceramic bushing to provide an electrically resistive path having a resistance in the range of about 2 to 85,000 ohms between the contact and grounded lining support, whereby there is normally a substantial resistance between the contact and ground and when the lining is worn to the limit there is an electrical short from the contact to ground.

3. A brake lining wear sensor for brakes having an electrically grounded lining support with an aperture, and an electrically grounded rotor, comprising
mounting means of semiconductive material surrounding the aperture in the support, and a conductive contact comprising a rivet extending through the aperture and securing the semiconductive mounting means to the support, the rivet having a head protruding toward the rotor to a position corresponding to the desired lining wear limit for making contact with the rotor when the wear limit is attained, whereby the semiconductive material provides an electrically resistive path between the contact and grounded support such that there is normally a substantial resistance between the contact and ground and when the lining is worn to the limit there is an electrical short from the contact to ground.

4. A brake lining wear sensor means for brakes having an electrically grounded lining support and an electrically grounded rotor, comprising a conductive contact on the lining support at a position corresponding to the desired lining wear limit for making contact with the rotor when the wear limit is attained, an indicator circuit coupled by a lead to the contact, means for mounting the contact on the grounded lining support to provide an electrically resistive path between the contact and grounded support, whereby there is normally a substantial resistance between the contact and ground, when the lining is worn to the limit there is an electrical short from the contact to ground, and when there is an open circuit to the contact there is an essentially infinite resistance from the indicator circuit to ground whereby the indicator circuit responds to the resistance between the circuit and ground to provide an output signal indicating lining conditions and any open circuit to the contact.

5. A brake lining wear sensor circuit for brakes having an electrically grounded lining support and an electrically grounded rotor, comprising a conductive contact on the lining support at a position corresponding to the desired lining wear limit for making contact with the rotor when the wear limit is attained, means for mounting the contact on the grounded lining support to provide an electrically resistive path between the contact and grounded support, and an indicator circuit coupled to the contact by a lead, the circuit including a resistor in series with the lead, a first window comparator across the resistor, a second window comparator connected by its respective inputs to the lead and to ground, first and second indicator lamps and lamp driving circuitry connected to the comparators whereby only the first comparator is turned "on" when the contact is shorted to the grounded rotor, only the second comparator is turned "on" when there is an open circuit between the first resistor and ground, and both comparators are "on" when the circuit and contact conditions are normal, whereby the indicator lamps are illuminated in combinations representing the enumerated conditions.

6. A brake lining wear sensor circuit as claimed in claim 5, wherein the first and second indicator lamps are different colors and have separate inputs and are packaged together to produce a single light output of either color when either one of the inputs is energized and a third apparent color when both inputs are energized, and the lamp driving circuitry includes a logic circuit to energize the first input when only the first comparator is "on", to energize the second input when both comparators are "on", and to energize both inputs when only the second comparator is "on".

* * * * *